(12) United States Patent
Kim et al.

(10) Patent No.: US 9,751,490 B1
(45) Date of Patent: Sep. 5, 2017

(54) SIDE AIRBAG FOR VEHICLE

(71) Applicant: Hyundai Motor Company, Seoul (KR)

(72) Inventors: Eung Man Kim, Gyeonggi-do (KR);
Kyu Jong Kim, Gyeonggi-do (KR);
Jae Soon Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/258,125

(22) Filed: Sep. 7, 2016

(30) Foreign Application Priority Data

Apr. 21, 2016 (KR) .................. 10-2016-0048923

(51) Int. Cl.
*B60R 21/231* (2011.01)
*B60R 21/239* (2006.01)
*B60R 21/207* (2006.01)

(52) U.S. Cl.
CPC ...... *B60R 21/23138* (2013.01); *B60R 21/207* (2013.01); *B60R 21/239* (2013.01); *B60R 2021/23146* (2013.01)

(58) Field of Classification Search
CPC ................................................. B60R 21/207
See application file for complete search history.

(56) References Cited

U.S. PATENT DOCUMENTS

| | | | | |
|---|---|---|---|---|
| 5,697,641 A * | 12/1997 | McGee | ............. | B60R 21/23138 280/730.2 |
| 9,327,673 B2 * | 5/2016 | Fukawatase | .......... | B60R 21/239 |
| 9,505,375 B2 * | 11/2016 | Kobayashi | .......... | B60R 21/2346 |
| 2007/0182135 A1 * | 8/2007 | Kai | ................... | B60R 21/23138 280/730.2 |
| 2007/0267854 A1 * | 11/2007 | Fukuda | ............. | B60R 21/23138 280/730.2 |
| 2008/0290635 A1 * | 11/2008 | Wieczorek | ............ | B60R 21/207 280/728.2 |
| 2009/0224520 A1 * | 9/2009 | Higuchi | ................ | B60R 21/239 280/740 |
| 2012/0043740 A1 | 2/2012 | Choi et al. | | |
| 2013/0147168 A1 * | 6/2013 | Alenspach | ........ | B60R 21/23138 280/730.2 |
| 2013/0200597 A1 * | 8/2013 | Honda | .................. | B60R 21/233 280/729 |
| 2013/0234421 A1 * | 9/2013 | Honda | .............. | B60R 21/23138 280/729 |
| 2013/0341896 A1 * | 12/2013 | Hotta | .................... | B60R 21/231 280/742 |
| 2014/0151985 A1 * | 6/2014 | Hotta | ................ | B60R 21/23138 280/730.2 |
| 2015/0336533 A1 * | 11/2015 | Haenel | ................ | B60R 21/2346 280/730.2 |

(Continued)

FOREIGN PATENT DOCUMENTS

| | | | | |
|---|---|---|---|---|
| DE | 102009005835 A1 * | 10/2009 | .......... | B60R 21/233 |
| JP | 2004-291789 A | 10/2004 | | |

(Continued)

*Primary Examiner* — Nicole Verley
(74) *Attorney, Agent, or Firm* — Mintz Levin Cohn Ferris Glovsky and Popeo, P.C.; Peter F. Corless

(57) ABSTRACT

A side airbag for a vehicle is provided. The side airbag includes an airbag cushion and a diffuser that is configured to diffuse gas within the interior of the airbag cushion. A vent aperture is configured to communicate within an interior of the airbag cushion to an exterior of the airbag cushion. A first seam line is formed in a shape that obstructs the vent aperture.

5 Claims, 3 Drawing Sheets

(56) References Cited

U.S. PATENT DOCUMENTS

2015/0367811 A1* 12/2015 Kobayashi .......... B60R 21/2346
                                                    280/730.2
2016/0159310 A1*  6/2016 Kobayashi ............ B60R 21/233
                                                    280/729
2016/0304047 A1* 10/2016 Tsukagoshi ....... B60R 21/23138

FOREIGN PATENT DOCUMENTS

| JP | 2005-186891 A | 7/2005 | |
|----|---------------|--------|---|
| JP | 2007-168792 A | 7/2007 | |
| JP | 2009-234562 A | 10/2009 | |
| JP | 2010-510131 A | 4/2010 | |
| JP | 2014104965 A * | 6/2014 | ........... B60R 21/207 |
| JP | 2014141231 A * | 8/2014 | ....... B60R 21/23138 |
| JP | WO 2014171180 A1 * | 10/2014 | ........... B60R 21/239 |
| JP | WO 2015093421 A1 * | 6/2015 | ....... B60R 21/23138 |
| KR | 2012-0122699 A | 11/2012 | |
| KR | 10-2014-0102547 A | 8/2014 | |
| WO | 2008/061888 A1 | 5/2008 | |

* cited by examiner

SIDE AIRBAG FOR VEHICLE

CROSS REFERENCE TO RELATED APPLICATION

The present application claims priority to Korean Patent Application No. 10-2016-0048923, filed Apr. 21, 2016, the entire contents of which is incorporated herein for all purposes by this reference.

BACKGROUND (a) Field of the Invention

The present invention relates to an airbag to protect an occupant during a vehicle collision, and more particularly, to a side airbag for a vehicle that during a side collision.

(b) Description of the Related Art

Generally, a vehicle includes various types of airbags to protect an occupant during a collision. In particular, a side airbag is inflated between a door and an occupant and protects the occupant by preventing the occupant from coming into direct contact with a door and door glass that are thrust into the passenger compartment when a side collision occurs. During a side collision, since a distance between an occupant and a collision point is less than the distance between the occupant and a collision point of a head-on collision, a side collision occurs near-instantaneously. Accordingly, rapid airbag inflation is required and pressure of an airbag cushion should be maintained for duration substantial enough to effectively protect an occupant. When airbag inflation is delayed by about 1 or 2 millisecond (ms) when a side collision occurs, the effectiveness of the airbag to protect an occupant is considerably reduced. Thus, research has been conducted to overcome the above problem.

In particular, when a vent aperture interferes with an armrest of a door or a position of an occupant's arm, the vent aperture may not be properly opened. For example, the vent aperture must be appropriately located. However, according to the related art, since the vent aperture is disposed in a position opposite to a diffuser, gas initially supplied to an airbag cushion is immediately vented out via the vent aperture. A substantial amount of gas loss occurs and inflation of a side airbag is delayed.

The foregoing is intended merely to aid in the understanding of the background of the present invention, and is not intended to mean that the present invention falls within the purview of the related art that is already known to those skilled in the art.

SUMMARY

The present provides a side airbag for a vehicle in which inflation speed of the airbag is increased by reducing loss of initially supplied gas at an initial inflation stage of the airbag.

In one aspect of the present invention, a side airbag for a vehicle may include an airbag cushion disposed between an occupant and a door trim, a diffuser disposed at a first side of the airbag cushion, and configured to diffuse gas supplied from an inflator within the interior of the airbag cushion, a vent aperture disposed at a second side of the airbag cushion and configured to provide communication between an interior of the airbag cushion to an exterior of the airbag cushion and a first seam line spaced apart from the vent aperture by a predetermined distance in a direction toward the diffuser and formed in a shape that obstructs the vent aperture.

A first end of the first seam line may align with an outer seam line of the airbag cushion. The first end of the first seam line may align with the outer seam line of the airbag cushion at a position above the vent aperture. A second end of the first seam line may be spaced apart from the vent aperture by a predetermined distance in the direction positioned toward the diffuser. The side airbag may further include a second seam line spaced apart from the first seam line by a predetermined distance in a direction positioned toward the diffuser and formed in a shape that obstructs a second end of the first seam line.

A seamed portion of the second seam line may be separated when a force equal to or greater than a predetermined level is applied to the second seam line of the force generated by an inflation pressure of the airbag cushion. The side airbag may further include a third seam line crossing the airbag cushion in a direction from the diffuser to a position below the vent aperture and the airbag cushion may be separated into upper and lower portions.

When the airbag cushion is fully inflated the vent aperture may be positioned between the door trim and an armrest. The airbag cushion may be inflated from a side portion of a seatback and a size of the airbag cushion may correspond to a length of the seatback.

According to the side airbag for a vehicle of the present invention, the inflation speed of an airbag may be increased by reducing gas loss through a vent aperture at an initial inflation stage of the airbag without increasing the capacity of an inflator. Further, the present invention may reduce an instance when the side airbag is not inflated. For example, the vent aperture may be positioned to prevent interference with any obstacles of a vehicle during airbag inflation.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
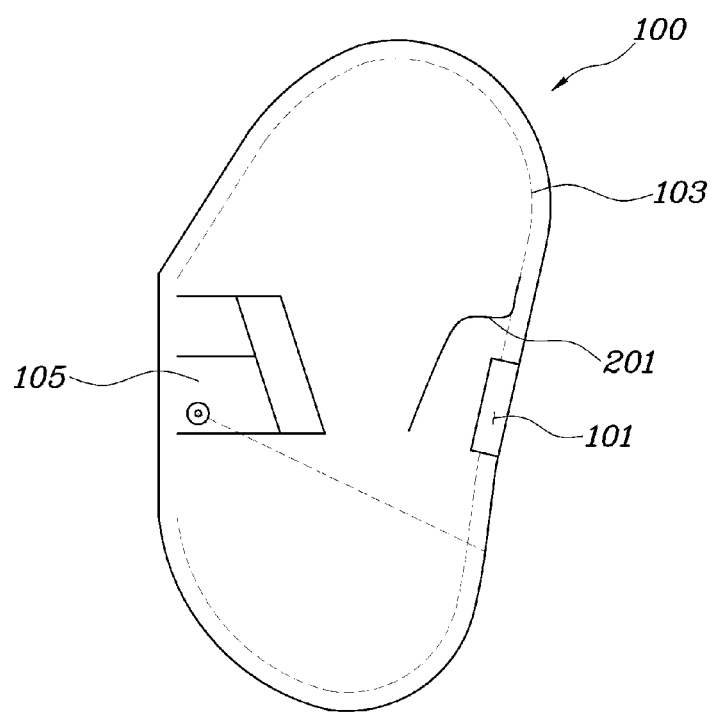
FIG. 1 is an exemplary view illustrating a side airbag for a vehicle according to an exemplary embodiment of the present invention.

Hereinbelow, exemplary embodiments of the present invention will be described in detail with reference to the accompanying drawings. Throughout the drawings, the same reference numerals will refer to the same or like parts. The present invention will be described more fully hereinafter with reference to the accompanying drawings, in which exemplary embodiments of the invention are shown. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present disclosure, and the same or similar constituent elements will be designated by the same reference numerals throughout the specification. Terms or words used in the specification and the claims should not be interpreted as being limited to a general or dictionary meaning and should be interpreted as a meaning and a concept which conform to the technical spirit of the present disclosure based on a principle that an inventor can appropriately define a concept of a term in order to describe his/her own disclosure by the best method.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 2:
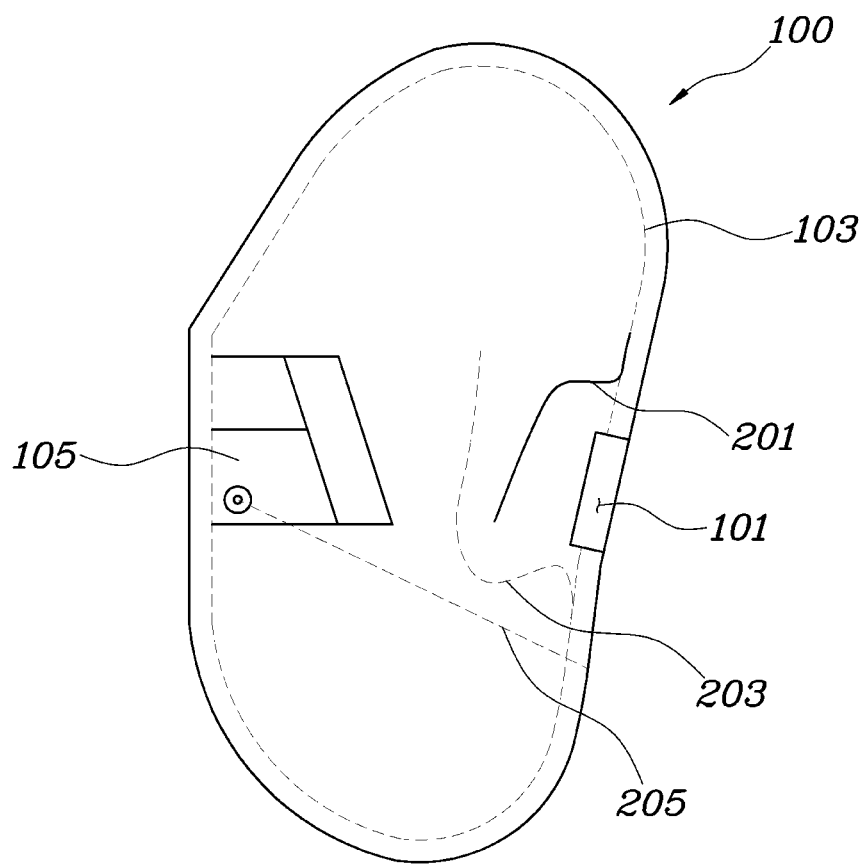
FIG. 2 is an exemplary view illustrating a side airbag for a vehicle according to an exemplary embodiment of the present invention.

FIGS. 1 and 2 are exemplary views illustrating a side airbag for a vehicle according to exemplary embodiments of the present invention. The side airbag according to the present invention may include an airbag cushion 100 disposed between an occupant and a door trim 301, a diffuser 105 provided at a first side of the airbag cushion 100 and configured to diffuse gas supplied from an inflator to the interior of the airbag cushion 100, a vent aperture 101 disposed at a second side of the airbag cushion 100 and configured to provide communication between an interior of the airbag cushion 100 to the exterior of the airbag cushion and a first seam line 201 spaced apart from the vent aperture 101 by a predetermined distance in a direction toward the diffuser 105 and formed in a shape that blocks the vent aperture 101.

Further, a first end of the first seam line 201 may align with an outer seam line 103 of the airbag cushion 100. Additionally, the first end of the first seam line 201 may align with the outer seam line 103 of the airbag cushion 100 at a position above the vent aperture 101. A second end of the first seam line 201 may be spaced apart from the vent aperture 101 by a predetermined distance and positioned in a direction toward the diffuser 105. The airbag cushion 100 may be inflated from a side portion of a seatback. A size of the airbag cushion 100 may correspond to a length of the seatback.

A vehicle may include various types of airbags to protect an occupant during a collision. For example, a side airbag may be inflated between a door and an occupant and may protect the occupant during a collision by preventing the occupant from being in direct contact with a door and door glass that may be thrust into the passenger compartment of the vehicle when a side collision occurs.

Figure 3:
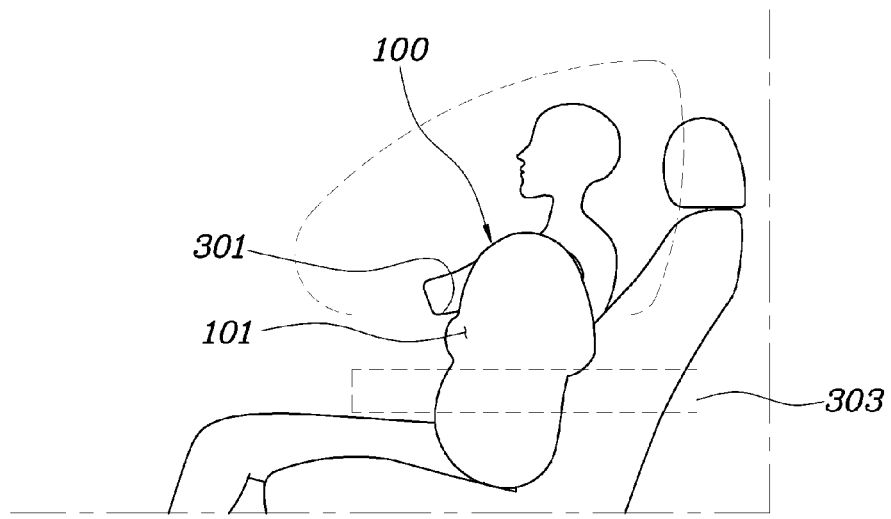
FIG. 3 is an exemplary view illustrating a side airbag for a vehicle with the size of the airbag cushion that corresponds to a length of the seatback according to an exemplary embodiment of the present invention

A side airbag may be disposed at various positions within a vehicle. For example, a side airbag may be disposed in the door trim 301 or a center pillar. In particular, during a side collision when impact energy is applied directly to a side airbag module the side airbag module may be damaged during the collision. Accordingly, the airbag cushion of the present invention may be inflated from a side portion of a seat. Since a door may be positioned proximate to the side of the occupant's body, (e.g., the occupant's shoulder to pelvis) that portion of the occupant's body proximate to the door should be provided additional protection that portions of the occupants body that are positioned farther away from the door. Further, since a body size of an occupant may vary as shown in FIG. 3, a size of the airbag cushion 100 corresponds to a length of the seatback to maximize protection of an occupant.

During a side collision, a distance between an occupant and a collision point is less than the distance between an occupant and a collision point during a head-on collision. In particular, the side collision may occur near-instantaneously. Accordingly, rapid airbag inflation may be required and pressure of the airbag cushion 100 may be maintained for a duration to effectively protect an occupant. When airbag inflation is delayed only by about 1 or 2 millisecond (ms) during the event of a side collision, the effectiveness of the airbag to protect an occupant may be considerably reduced. However, the side airbag according to the related art allows gas supplied from an inflator to be discharged via the vent aperture 101 prior to inflation of the airbag cushion 100 and gas loss occurs.

Accordingly, in the present invention, as shown in FIG. 1, the first seam line 201 may be formed in a shape that obstructs the vent aperture 101. Further, the first end of the first seam line 201 aligns with the outer seam line of the airbag cushion at a position above the vent aperture 101. In particular, the first end of the first seam line may be closed to be sealed at the position above the vent aperture. The second end of the first seam line may obstruct the vent aperture 101 but may also be open toward a position below the vent aperture 101 to restrict supplied gas from being discharged to the exterior. For example, the gas may be discharged via a detour toward a position disposed below the first seam line 201 after inflation of the airbag cushion 100. Furthermore, the amount of initially discharged gas may be adjusted by varying the amount of gas that is directed toward an obstruction of the vent aperture 101 adjusted by the second end of the first seam line. Accordingly, inflation speed of the side airbag may be adjusted. Accordingly, inflation speed of the side airbag may be increased by reducing loss of initially supplied gas. Alternatively, an inflator capacity may be reduced while maintaining a substantially similar inflation speed of the side airbag.

The side airbag may further include a second seam line 203 spaced apart from the first seam line 201 by a predetermined distance in a direction toward the diffuser 105 and may be formed in a shape that obstructs the second end of the first seam line 201. Further, a seamed portion of the second seam line 203 may be separated when a force equal to or greater than a predetermined level is applied to the second seam line to generate the force by an inflation pressure of the airbag cushion 100.

As shown in FIG. 2, the amount of loss of initially supplied gas may be further reduced when the route for gas discharge is directed toward an open portion of the second end of the first seam line 201 obstructed by the second seam line 203. Since gas venting may also be required to prevent the airbag cushion 100 from bursting by inflation pressure of an inflator, the seamed portion of the second seam line 203 may be configured to be separated by the inflation pressure when the amount of initially supplied gas is equal to or greater than a predetermined level.

As described above, the amount of initially discharged gas may be adjusted by varying the amount of gas that may be directed toward an obstructed vent aperture 101 adjusted by the second end of the first seam line 201. Accordingly, in the second seam line, the inflation speed of the side airbag may also be adjusted by varying a detour route of gas. For example, the predetermined distance spaced apart from the first seam line in the direction toward the diffuser may be adjusted. The side airbag may further include a third seam line 205 that crosses the airbag cushion 100 in a direction from the diffuser 105 to a position below the vent aperture 101 and the airbag cushion 100 may be separated into upper and lower portions.

As shown in FIGS. 1 and 2, the entire volume of the airbag cushion 100 may be reduced by the third seam line 205 that separates the airbag cushion 100 into upper and lower portions. Further, during a side collision, when a distance between a protruding armrest 303 of a door and occupant's pelvis is less than the other portions of occupant's body and the side collision occurs near-instantaneously, the lower portion of the airbag cushion 100 may be inflated more rapidly by the third seam line 205. Accordingly, a direct impact to an occupant may be prevented during a collision.

Furthermore, when the airbag cushion is fully inflated, the vent aperture 101 may be disposed between the door trim 301 and the armrest 303. When the vent aperture 101 is improperly positioned, the vent aperture may be obstructed by the door trim 301 or may interfere with a position of an occupant's arm. Namely, gas may not be discharged or the airbag cushion may be prevented from proper inflation and the vent aperture 101 may function improperly. Accordingly, as shown in FIG. 3, the vent aperture 101 may be disposed between a boundary of door glass and the door trim 301 and the armrest 303. Accordingly, the vent aperture may properly function by reducing interference with the door trim or occupant's arm.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A side airbag for a vehicle, comprising:
   an airbag cushion disposed between an occupant and a door trim;
   a diffuser disposed at a first side of the airbag cushion, and configured to diffuse gas supplied from an inflator within the airbag cushion;
   a vent aperture disposed at a second side of the airbag cushion, and configured to communicate within an interior of the airbag cushion to an exterior thereof;
   a first seam line spaced apart from the vent aperture by a predetermined distance in a direction toward the diffuser, and formed in a shape that obstructs the vent aperture;
   a second seam line spaced apart from the first seam line by a predetermined distance in a direction toward the diffuser, and formed in a shape that obstructs a second end of the first seam line; and
   a third seam line that crosses the airbag cushion in a direction from the diffuser to a position below the vent aperture and separates the airbag cushion into upper and lower portions,
   wherein a seamed portion of the second seam line is separated when a force equal to or greater than a predetermined level is applied to the second seam line such that the gas is vented out by making a detour toward a position below the first seam line after the cushion is inflated, the force being generated by an inflation pressure of the airbag cushion.

2. The side airbag of claim 1, wherein a first end of the first seam line coincides with an outer seam line of the airbag cushion.

3. The side airbag of claim 2, wherein the first end of the first seam line coincides with the outer seam line of the airbag cushion at a position above the vent aperture, and a second end of the first seam line is spaced apart from the vent aperture by a predetermined distance in the direction toward the diffuser.

4. The side airbag of claim 1, wherein when the airbag cushion is fully inflated, the vent aperture is disposed between the door trim and an armrest.

5. The side airbag of claim 1, wherein the airbag cushion is configured to be inflated from a side portion of a seatback, and a size of the airbag cushion corresponds to a length of the seatback.

* * * * *